(12) United States Patent
Suzui

(10) Patent No.: US 8,127,318 B2
(45) Date of Patent: Feb. 28, 2012

(54) DISC DEVICE

(75) Inventor: Yuichiro Suzui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 127 days.

(21) Appl. No.: 12/671,037

(22) PCT Filed: Jun. 13, 2008

(86) PCT No.: PCT/JP2008/001530
§ 371 (c)(1),
(2), (4) Date: Jan. 28, 2010

(87) PCT Pub. No.: WO2009/057233
PCT Pub. Date: May 7, 2009

(65) Prior Publication Data
US 2010/0205621 A1  Aug. 12, 2010

(30) Foreign Application Priority Data
Oct. 31, 2007  (JP) ................................. 2007-283423

(51) Int. Cl.
*G11B 17/051* (2006.01)
(52) U.S. Cl. ........................................................ 720/624
(58) Field of Classification Search .......... 720/624–626, 720/645
See application file for complete search history.

(56) References Cited

U.S. PATENT DOCUMENTS

| 2002/0001280 A1* | 1/2002 | Yabushita ............... 369/77.1 |
| 2004/0032818 A1* | 2/2004 | Toyama et al. ............ 369/215 |
| 2005/0086672 A1* | 4/2005 | Shimozaki .............. 720/619 |

FOREIGN PATENT DOCUMENTS
EP  1 752 982 A1  2/2007
(Continued)

OTHER PUBLICATIONS

English Machine translation of JP 2006-252607 A, to Kobayashi, published on Sep. 26, 2006.*

*Primary Examiner* — Will J Klimowicz
(74) *Attorney, Agent, or Firm* — Birch, Stewart, Kolasch & Birch, LLP

(57) ABSTRACT

A disc device is disposed to include contact parts which are relatively and respectively disposed in a roller base member and a slider member in such a way that a movement of the roller base member which receives the spring force of a pushing member to move a conveying roller to a disk conveying position causes a backward movement force to be applied to the slider member after engagement between a rack and a driving gear is released and a driving action of a cam part on the conveying roller is released while the slider member retracts to a disc insertion standby position.

5 Claims, 9 Drawing Sheets

FOREIGN PATENT DOCUMENTS

| | | | |
|---|---|---|---|
| JP | 2003-123359 A | | 4/2003 |
| JP | 2003173666 A | * | 6/2003 |
| JP | 2004-199831 A | | 7/2004 |
| JP | 2005-78681 A | | 3/2005 |
| JP | 2006-92666 A | | 4/2006 |
| JP | 2006252607 A | * | 9/2006 |

* cited by examiner

DISC DEVICE

FIELD OF THE INVENTION

The present invention relates to a disc device that performs insertion and ejection of a disc into and from a main unit thereof by using a conveying roller.

BACKGROUND OF THE INVENTION

A conventional disc device is typically constructed in such a way that a slider member having a rack is driven to an operating position by a gear engaged with this rack, and is also driven from the operating position to a standby position, and a spring is mounted, as a pushing member, to the slider member in order to move the slider member to the standby position after the engagement between the rack and the gear is released while the slider member moves to the standby position, as described in, for example, patent reference 1.
[Patent reference 1] JP,2004-199831,A gazette A problem with the conventional disc device is however that because only the spring force of the spring serves as the means for moving the slider member to the standby position after the engagement between the rack and the gear is released, as mentioned above, the slider member cannot move to the standby position when the load against the movement of the slider member exceeds the spring force of the spring because of, for example, a variation in the driving force of the gear at the time when the driving force is converted to the spring force of the spring.

A further problem is that even in a case in which the slider member is on standby at the standby position, when a shock exceeding the above-mentioned spring force of the spring is applied to the slider member due to a drop or the like of the disc device at the time of transfer, the slider member moves and collides with another member and is then damaged, or a displacement occurs in the slider member and the slider member therefore cannot operate normally at the time of start of the operation of the disc device.

Therefore, in order to solve the above-mentioned problems, there can be considered a measure of strengthening the spring force of the spring, or a measure of disposing a counteractive member for exclusive use or the like. However, in order to drive the slider member whose movement load is increased, a motor having a large driving force has to be adopted, and hence the disc device increases in size inevitably. A further problem is that provision of a counteractive member for exclusive use increases the cost of the disc device.

The present invention is made in order to solve the above-mentioned problems, and solves the problem that the slider member cannot return to its standby position by using a rotational force of a roller base member for moving a conveying roller to a disk conveying position to place the conveying roller in a standby state. It is an object of the present invention to provide a disc device that can prevent a slider member thereof from being displaced from its standby position even when a shock is applied to the slider member due to a drop or the like of the disc device at the time of transfer.

DISCLOSURE OF THE INVENTION

In accordance with the present invention, there is provided a disc device including contact parts which are relatively and respectively disposed in a roller base member and a slider member in such a way that a movement of the roller base member which receives the spring force of a pushing member to move a conveying roller to a disk conveying position causes a backward movement force to be applied to the slider member after engagement between a rack and a driving gear is released and a driving action of a cam part on the conveying roller is released while the slider member retracts to a disc insertion standby position.

The disc device in accordance with the present invention is constructed in such a way as to move the slider member to the standby position by using the movement of the roller base member that receives the spring force of the pushing member to move the conveying roller to the disk conveying position. Therefore, even though the load on the slider member against the movement of the slider member to the standby position increases for some reason, the disc device can cause the slider member to move backwardly through the movement of the roller base member as long as the roller base member can move the conveying roller to the disk conveying position. Furthermore, even though a shock is applied to the slider member due to a drop or the like of the disc device when the slider member is placed in the standby state at the standby position, the contact between the contact parts which are relatively and respectively disposed in the roller base member and the slider member can certainly prevent the slider member from displacing from the standby state to prevent a breakage accident from occurring due to a collision of the slider member with another member.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
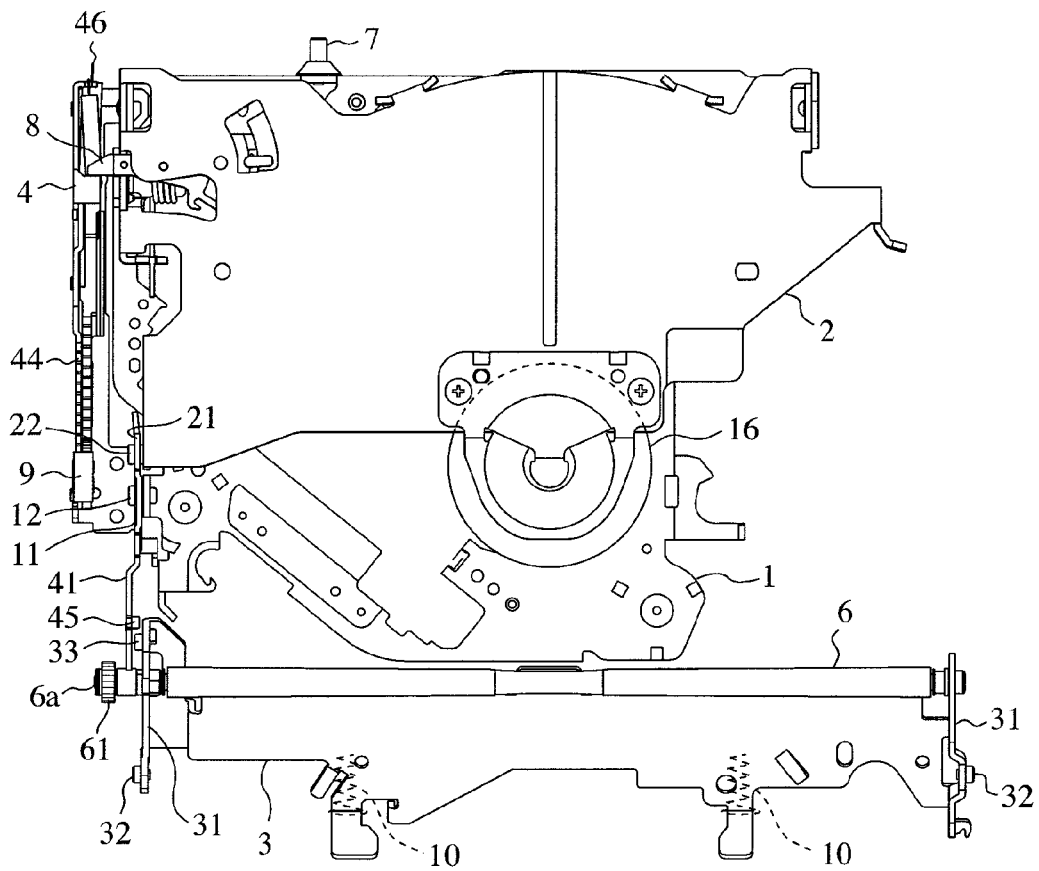
FIG. 1 is a plan view showing only a main part in a disc insertion standby state of a disc playback device in accordance with Embodiment 1 of the present invention.
Figure 2:
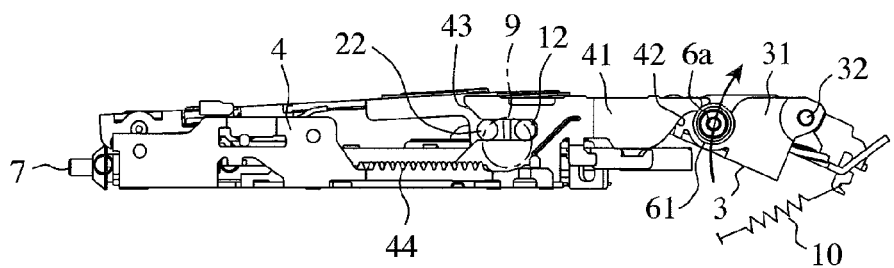
FIG. 2 is a left side view of FIG. 1.
Figure 3:
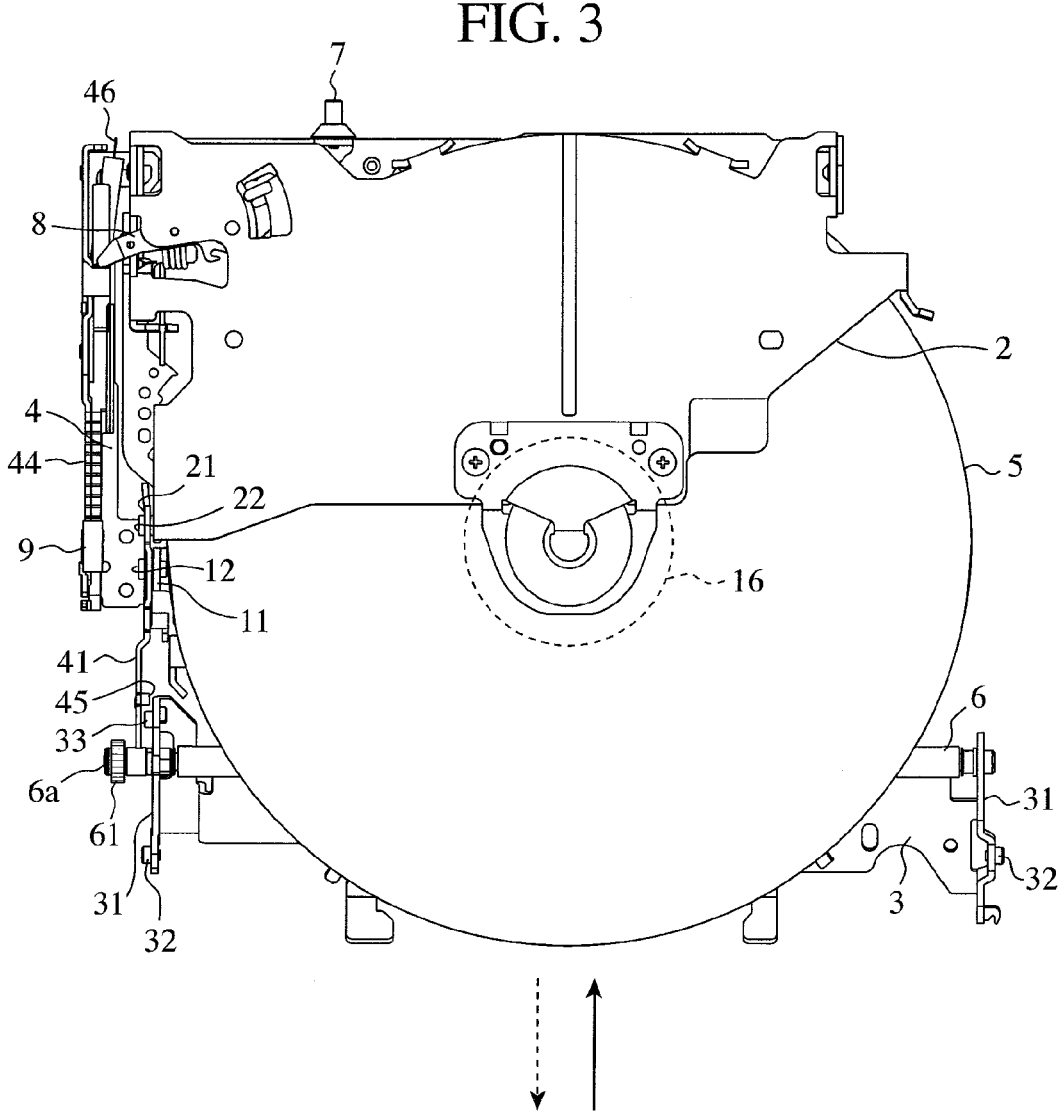
FIG. 3 is a plan view showing only the main part in a state in which a disc is inserted.
Figure 4:
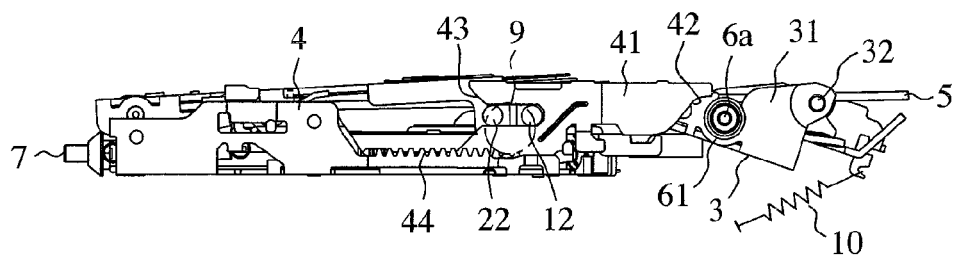
FIG. 4 is a left side view of FIG. 3.
Figures 5, 6:
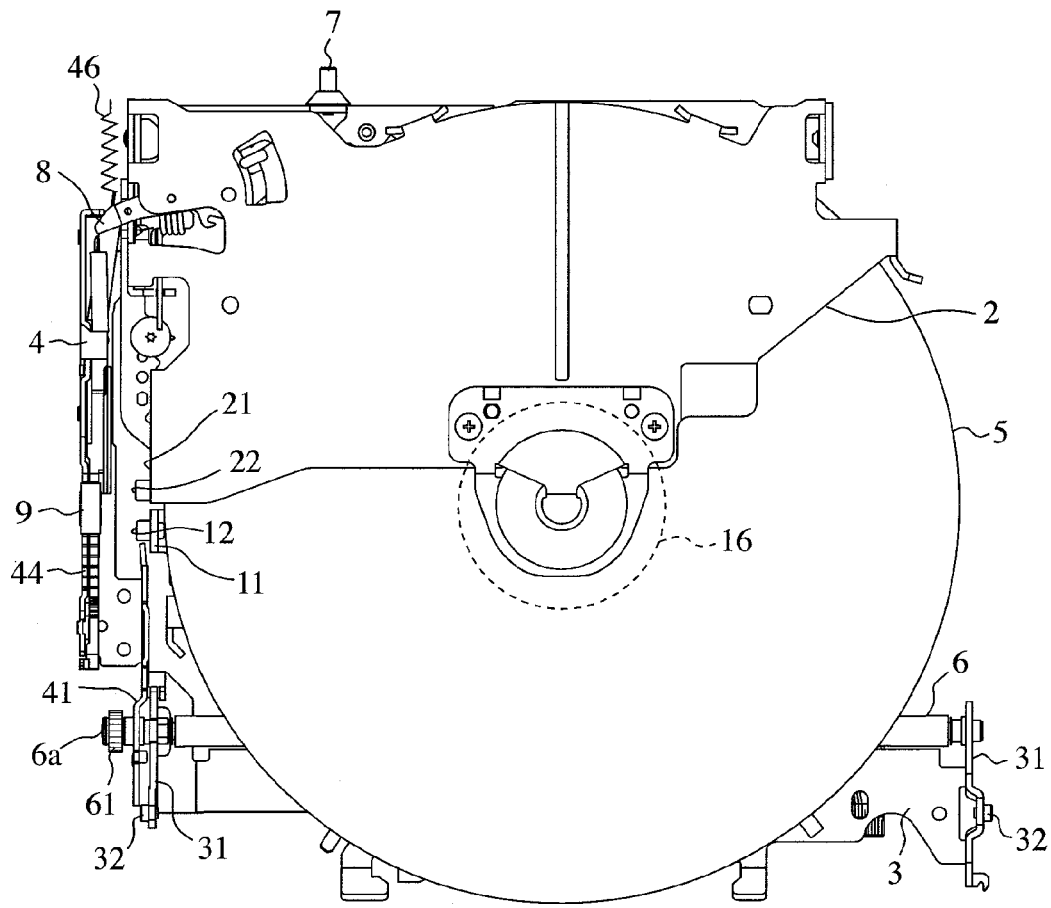
FIG. 5 is a plan view showing only the main part in a disc playback state.
FIG. 6 is a left side view of FIG. 5.
Figure 7:
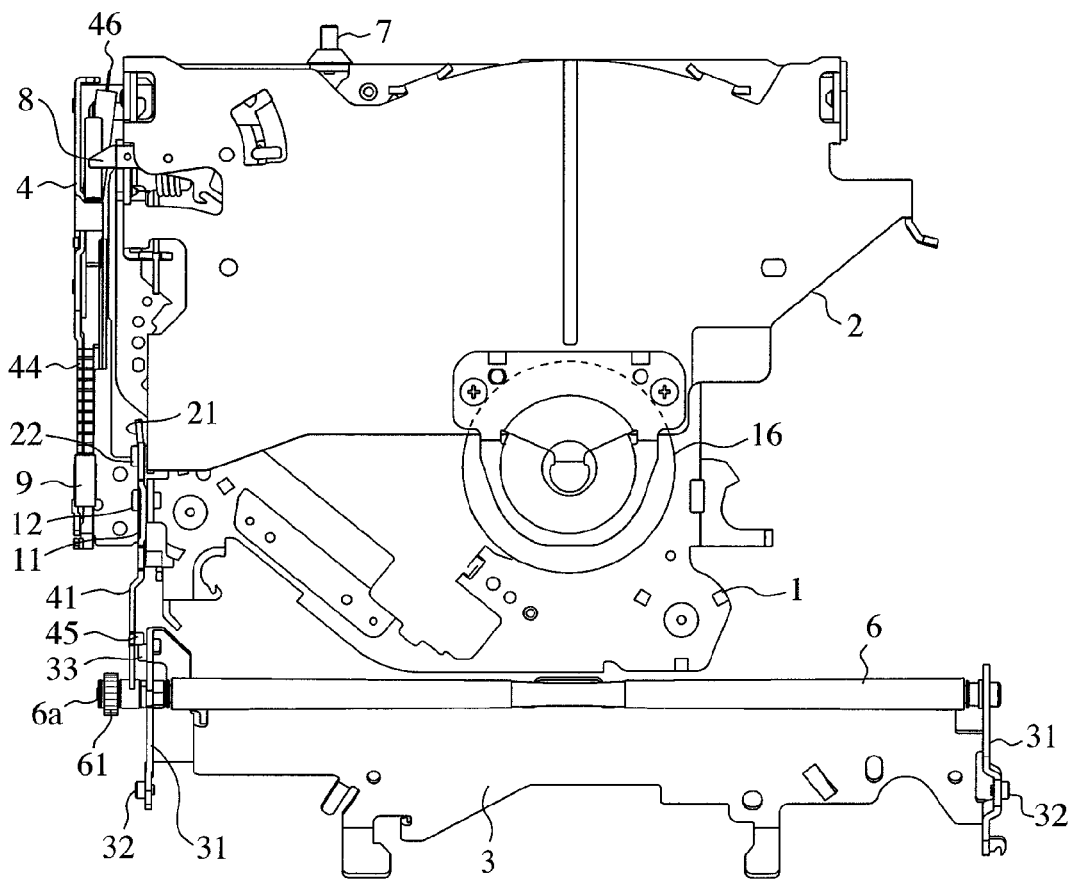
FIG. 7 is a plan view showing only the main part in a state in which a slider member is at rest immediately after engagement between a driving gear and a rack is released.
Figure 8:
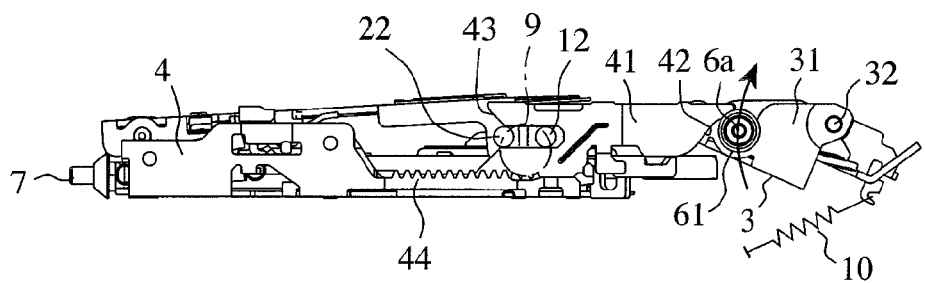
FIG. 8 is a left side view of FIG. 7.
Figure 9:
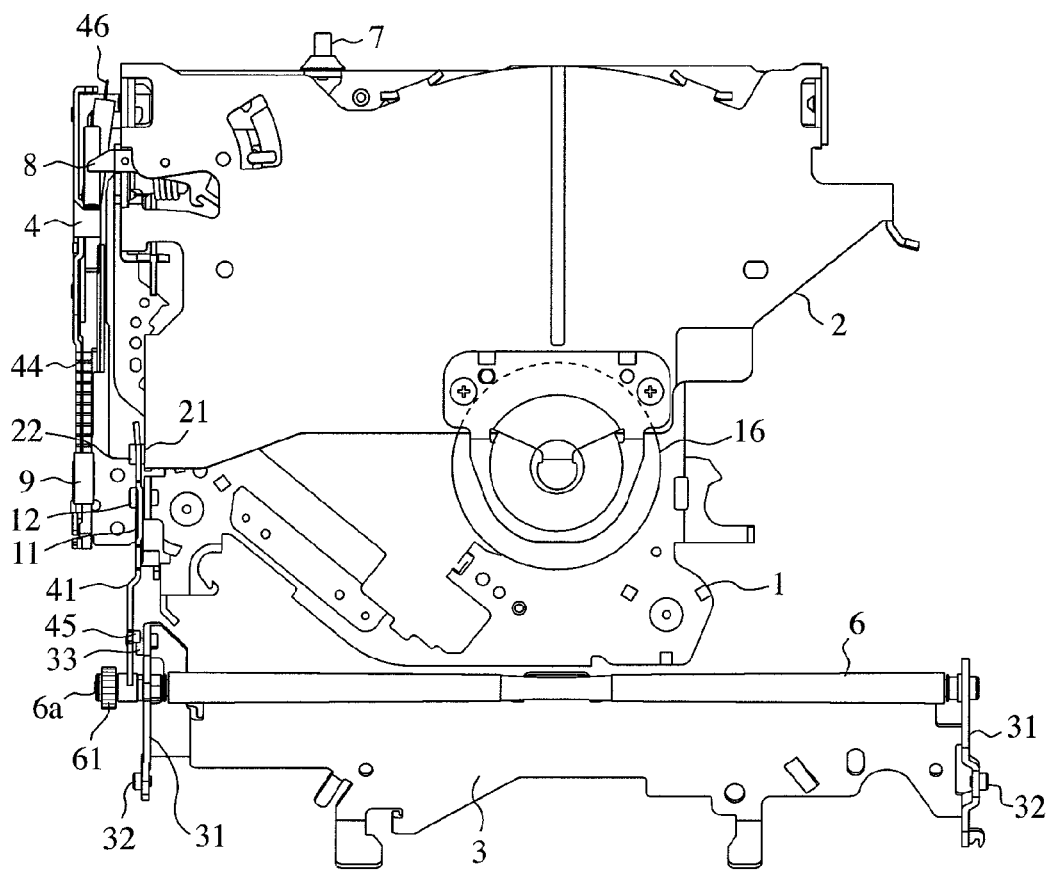
FIG. 9 is a plan view showing a state in which the slider member is pushed toward a direction of a predetermined position by contact between an engaging member of a roller base member and that of the slider member.
Figure 10:
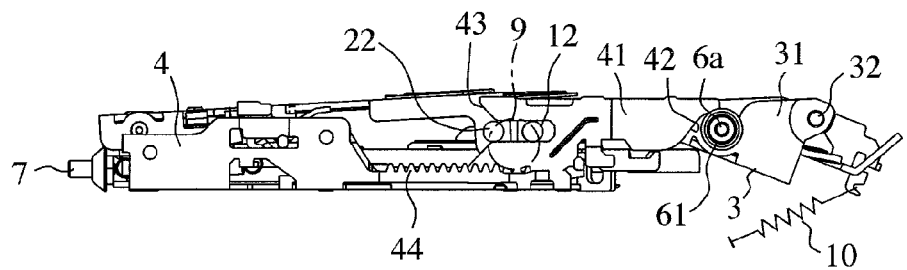
FIG. 10 is a left side view of FIG. 9.
Figure 11:
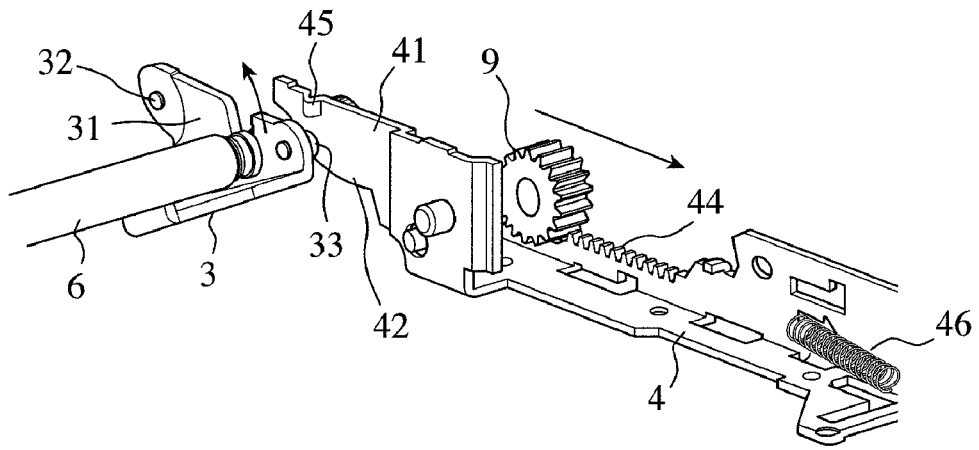
FIG. 11 is a perspective view showing a state before the engaging member of the roller base member is brought into contact with that of the slider member.
Figure 12:
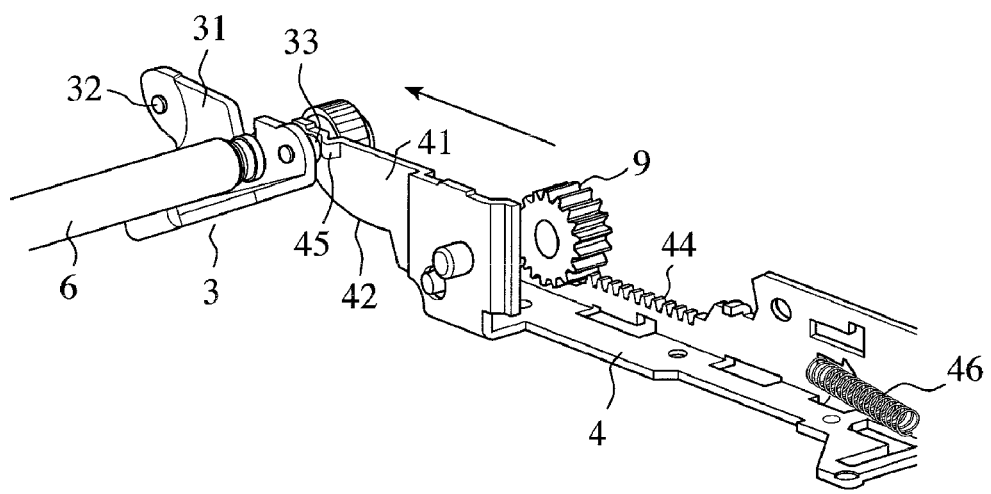
FIG. 12 is a perspective view showing a state in which the engaging member of the roller base member has been brought into contact with that of the slider member.
Figure 13:
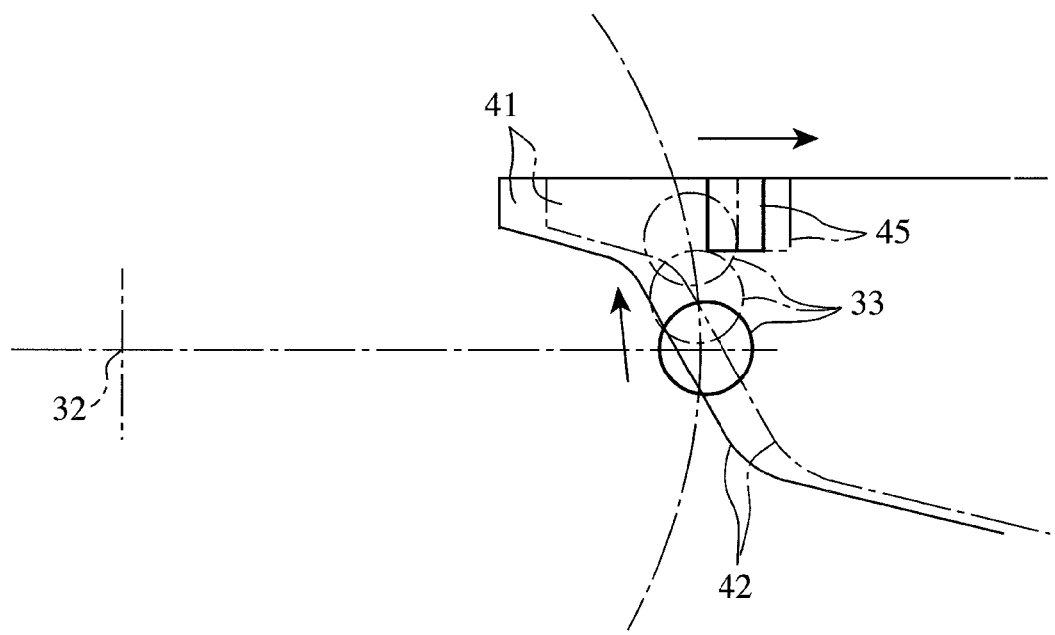
FIG. 13 is an explanatory drawing showing a state in which the slider member is moved toward a direction of a standby position by a movement of the roller base member.

FIG. 1 is a plan view showing only a main part in a disc insertion standby state of a disc playback device in accordance with Embodiment 1 of the present invention, FIG. 2 is a left side view of FIG. 1, FIG. 3 is a plan view showing only the main part in a state in which a disc is inserted, FIG. 4 is a left side view of FIG. 3, FIG. 5 is a plan view showing only the main part in a disc playback state, FIG. 6 is a left side view of FIG. 5, FIG. 7 is a plan view showing only the main part in a state in which a slider member is at rest immediately after engagement between a driving gear and a rack is released, FIG. 8 is a left side view of FIG. 7, FIG. 9 is a plan view showing a state in which the slider member is pushed toward a direction of a predetermined position by contact between an engaging member of a roller base member and that of the slider member, FIG. 10 is a left side view of FIG. 9, FIG. 11 is a perspective view showing a state before the engaging member of the roller base member is brought into contact with that of the slider member, FIG. 12 is a perspective view showing a state in which the engaging member of the roller base member has been brought into contact with that of the slider member, and FIG. 13 is an explanatory drawing showing a state in which the slider member is moved toward a direction of a standby position by a movement of the roller base member.

The disc device in accordance with Embodiment 1 of the present invention is provided with a playback base 1, an arm clamp 2, the roller base member 3, and the slider member 4. The playback base 1 is disposed in such a way as to be locked to and unlocked from a not-shown chassis base plate by way of a buffer member (not shown) locked to a buffer member locking member 7, and includes a turntable 11. The arm clamp 2 is rotatably supported to the playback base 1 on a back side of the main unit where a disc 5 is inserted.

The roller base member 3 has side plates 31 and 31 which are extending in a direction substantially perpendicular thereto at both ends thereof, and which are rotatably supported, via axes 32 and 32, to the not-shown chassis base plate. Both ends of a conveying roller 6 for conveying the disc 5 are rotatably supported to the side plates 31 and 31 respectively. At an end of an axis 6a of the conveying roller 6 penetrating through one of these side plates 31, a gear 61 engaged with and released from a driving gear disposed on the not-shown chassis base plate is disposed. Furthermore, between the roller base member 3 and the not-shown chassis base plate, springs 10 each for always applying a rotational force in a direction of an arrow shown in FIG. 2 to the roller base member 3 are disposed so as to keep the conveying roller 6 at the disk conveying position.

The slider member 4 is supported to the not-shown chassis base plate in such a way as to be able to move along one of the side plates 31 in forward and backward directions. Between this slider member 4 and the not-shown chassis base plate, a spring 46 for pushing this slider member backwardly is disposed. A disc insertion detecting lever 8 is engaged with the slider member 4 in such a way as to move this slider member 4 forwardly (in a direction of the front side of the disc device) when detecting insertion of the disc 5 and then rotating.

A cam part 42 for downwardly pushing the conveying roller 6 against the spring forces of the springs 10 is further disposed at a front end of a side plate 41 extending substantially perpendicularly from the slider member 4, the slide plate being disposed close to the above-mentioned side plate 31. Furthermore, a back end of this side plate 41 has a cam groove 43 into which a pin 12 disposed on an outer surface of a side plate 11 of the playback base 1 and a pin 22 disposed on an outer surface of a side plate 21 of the arm clamp 2 are led. The slider member 4 also has a rack 44 extending in forward and backward directions and in parallel with the cam groove 43. The driving gear 9 disposed on the not-shown chassis base plate is engaged with this rack 44.

Next, the operation of the disc device will be explained. First, in the disc insertion standby state shown in FIGS. 1 and 2, the slider member 4 retracts (moves backwardly) by the spring force of the spring 46, and is held at the standby position. As a result, the rack 44 is released from the driving gear 9, and the cam part 42 of the slider member 4 does not act on the conveying roller 6. Therefore, the roller base member 3 receives the spring forces of the springs 10 to rotate about the axis 32 of the side plate 31 in a direction of an arrow shown in FIG. 2, and then holds the conveying roller 6 at the disk conveying position. At this time, the gear 61 disposed at the end of the conveying roller 6 is engaged with the driving gear disposed on the not-shown chassis base plate.

When the disc 5 is inserted in the disc insertion standby state shown in FIGS. 1 and 2, the driving gear disposed on the not-shown chassis base plate starts rotating according to a signal from a not-shown detecting unit which has detected this insertion, and the conveying roller 6 then rotates via the gear 61 which is engaged with this driving gear. The inserted disc 5 is then conveyed with being sandwiched between the conveying roller 6 and a not-shown disk guide, and is further conveyed until it is held at a predetermined position as shown in FIGS. 3 and 4, i.e. onto the turntable 11.

After the disc 5 is conveyed to the predetermined position shown in FIGS. 3 and 4, a movement of the disc insertion detecting lever 8, which is pushed and moved by this conveyed disc, from the position of FIG. 1 to the position of FIG. 3 pushes and moves the slider member 4 forwardly (toward the front side of the main unit) against the spring force of the spring 46. As a result, the rack 44 is engaged with the driving gear 9, and, after that, the slider member 4 further moves forwardly according to rotation of the driving gear 9, as shown in FIGS. 5 and 6. As the slider member moves this way, the cam part 42 disposed at the front end of the slider member 4 acts on the conveying roller 6 to cause the roller base member 3 to rotate against the spring forces of the springs 10 in a direction of an arrow shown in FIG. 6 by way of this conveying roller, thereby downwardly pushing the conveying roller 6 toward a direction under the disc 5.

On the other hand, the movement of the slider member 4 releases both the pin 12 formed on the outer surface of the side plate 11 of the playback base 1 and the pin 22 formed on the outer surface of the side plate 21 of the arm clamp 2 from the cam groove 43. As a result, the playback base 1 is unlocked and is held by, via the buffer member (not shown) locked to the buffer member locking member 7, the not-shown chassis base plate in such a way as to be able to freely shake. The arm clamp 2 is also unlocked and rotates, and pushes the disc 5 toward the turntable to hold the disc 5. Therefore, vibrations from a vehicle body equipped with this disc device can be prevented from propagating to the playback base 1 by the buffer member (not shown), and the disc 5 can be certainly held on the turntable 11. As a result, playback of the disc is carried out with stability.

When the disc device shifts to an operation of ejecting the above-mentioned disc 5 after ending the playback of the disc 5 in the playback state of the disc 5, the driving gear 9 starts rotating in a reverse direction and the slider member 4 then retracts through the engagement between the rack 44 and the driving gear 9. When the engagement between the rack 44 and the driving gear 9 is released, the slider member 4 is made to retract up to the standby position by the spring force of the spring 46 and is placed in the disc insertion standby state shown in FIGS. 1 and 2. The conveying roller 6 which is engaged with the cam part 42 disposed at the front end of the slider member 4 moves upwardly as the slider member 4 retracts, the gear 61 starts rotating in a reverse direction, and the conveying roller 6 ejects the disc 5 from the disc device.

At this time, even though a large load is imposed on the slider member 4 for some reason and the slider member 4 cannot be moved to the standby position by the spring force of the spring 46 immediately after the engagement between the rack 44 and the driving gear 9 is released, as shown in FIGS. 7 and 8, while the roller base member 3 rotates in a direction of an arrow shown in FIG. 11 in order to return the conveying roller 6 to the disk conveying position, a contact part 33 which is an engagement projection disposed on the outer surface of the side plate 31 of the roller base member 3 comes into contact with a contact part 45 which is an engagement projection disposed on the slider member 4, as shown in FIG. 12, to push and move the slider member toward a direction of the standby position as shown by broken chain lines of FIG. 13. As a result, even after the engagement between the rack 44 and the driving gear 9 is released, the slider member 4 moves to the standby position, and returns to the standby position, as shown in FIGS. 9 and 10. As a result, operations starting from an operation of inserting a disc the next time can be performed smoothly.

As mentioned above, the disc device in accordance with the present invention is constructed in such a way as to move the slider member to the standby position by using the movement of the roller base member that receives the spring force of the pushing member to move the conveying roller to the disk conveying position. Therefore, even though the load on the slider member against the movement of the slider member to the standby position increases for some reason, the disc device can cause the slider member to move backwardly through the movement of the roller base member as long as the roller base member can move the conveying roller to the disk conveying position. Furthermore, even though a shock is applied to the slider member due to a drop or the like of the disc device when the slider member is placed in the standby state, the contact between the contact parts which are relatively and respectively disposed in the roller base member and the slider member can prevent the slider member from moving to certainly prevent a breakage accident from occurring due to a collision of the slider member with another member.

Embodiment 2

In above-mentioned Embodiment 1, the contact parts 33 and 45 are relatively and respectively disposed in the roller base member 3 and the slider member 4 in such a way that the engagement between the rack 44 and the driving gear 9 is released and the driving action of the cam part 42 on the conveying roller 6 is also released while the slider member 4 retracts to the disc insertion standby position, and the movement of the roller base member 3 which moves the conveying roller 6 to the disk conveying position by receiving the spring force of the pushing member 10 causes the slider member 4 to move in a direction toward the standby position. In contrast, in this Embodiment 2, as shown in FIGS. 14 to 17, a contact part 33 which is one of the above-mentioned engagement contact part members 33 and 45 is a pin, and another engagement contact part member 45 is a cam-shaped one. As an alternative, the contact part 33 which is one of the above-mentioned engagement contact part members is a cam-shaped one, and the other engagement contact part member 45 is a pin.

Figure 14:
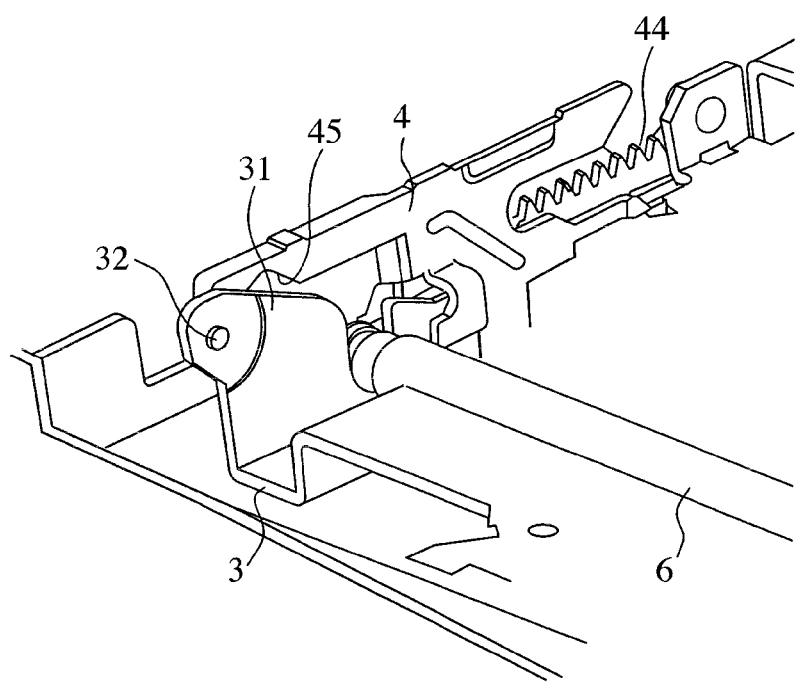
FIG. 14 is a perspective view showing a playback state in which the slider member 4 is moved to a front side of the main unit when viewed from the inside of the disc playback device.
Figure 15:
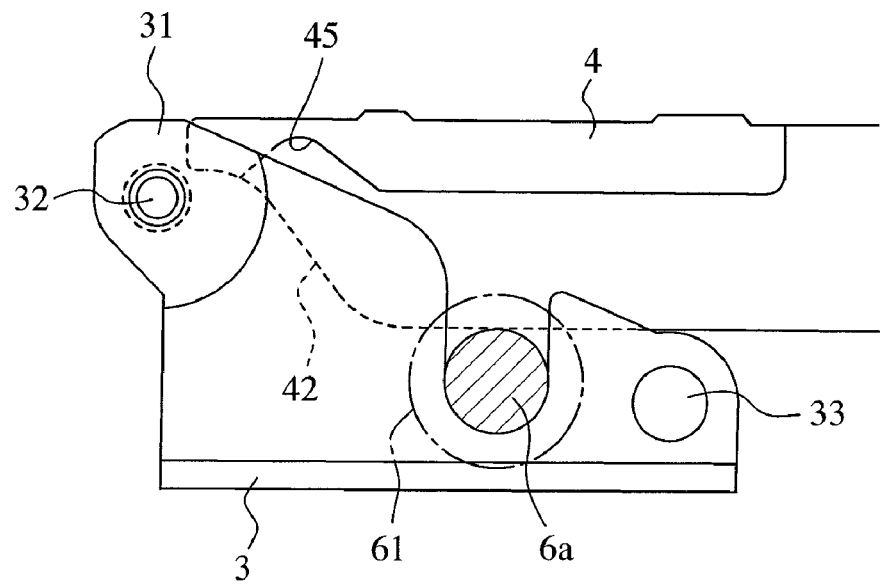
FIG. 15 is a left side view of FIG. 14.
Figure 16:
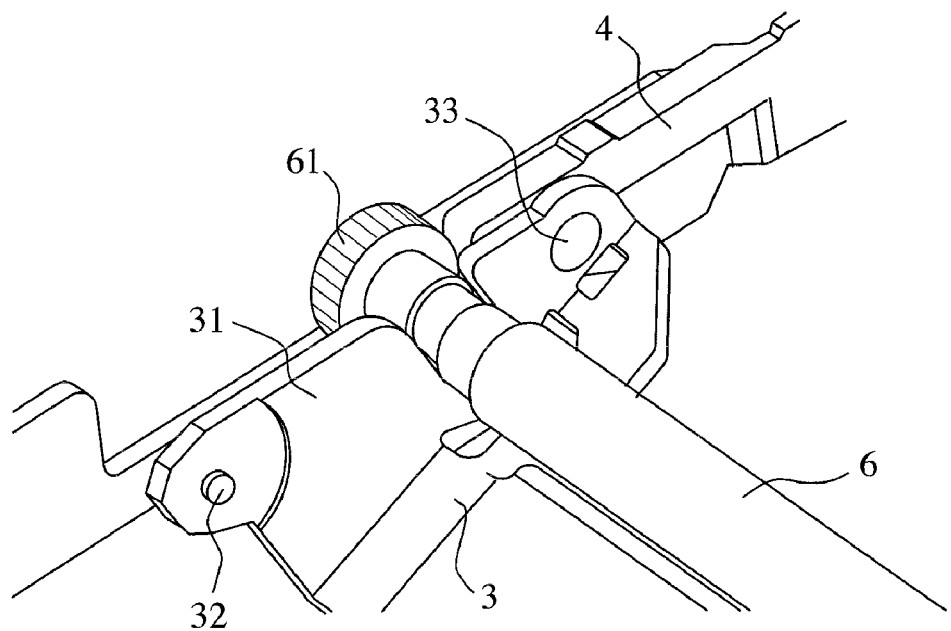
FIG. 16 is a perspective view showing a disc insertion standby state in which the slider member 4 is moved to a back side of the main unit when viewed from the inside of the disc playback device.
Figure 17:
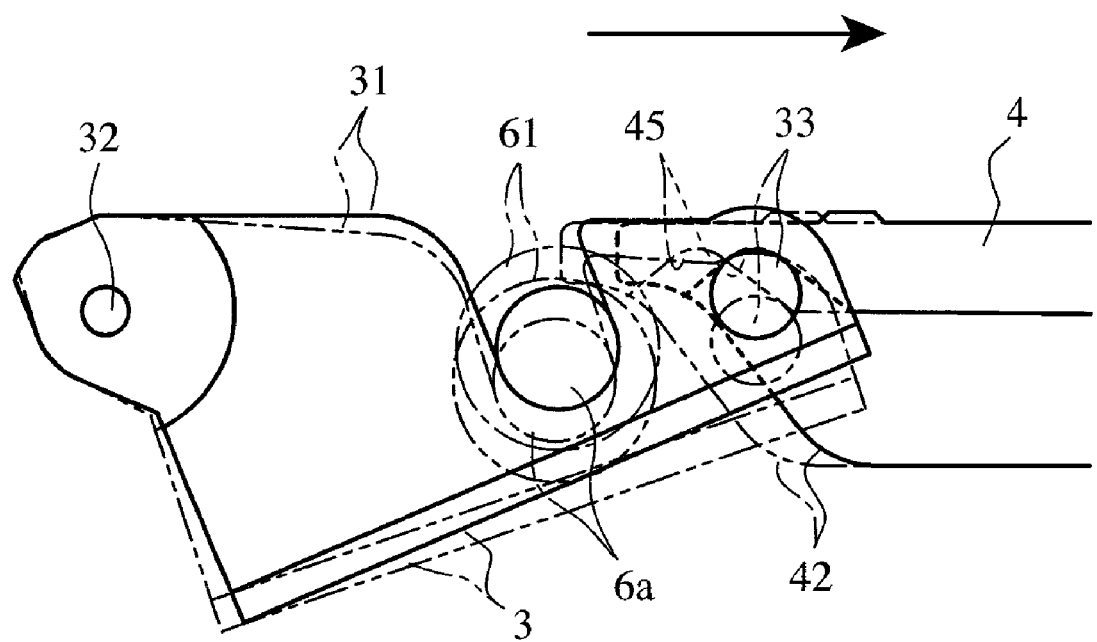
FIG. 17 is a left side view of FIG. 16.

FIG. 14 is a perspective view showing a playback state in which a slider member 4 is moved to a front side of the main unit of the disc device when viewed from the inside of the disc device, FIG. 15 is a left side view of FIG. 14, FIG. 16 is a perspective view showing a disc insertion standby state in which the slider member 4 is moved to a back side of the main unit when viewed from the inside of the disc device, and FIG. 17 is a left side view of FIG. 16.

In the playback state as shown in FIGS. 14 and 15, a cam part 42 disposed at a front end of the slider member 4 acts on a conveying roller 6, and, via this conveying roller, downwardly pushes a roller base member 3 against the spring force of a spring 10. In this playback state, when the disc device shifts to an operation of ejecting a disc 5 and then causes a driving gear 9 to rotate in a reverse direction, as explained in above-mentioned Embodiment 1, the slider member 4 moves to the back side of the main unit (toward a direction of a standby position) through engagement with the driving gear 9, and, via the conveying roller 6 acting on the cam part 42, the roller base member 3 is rotated as shown in FIGS. 16 and 17 from the position shown in FIGS. 14 and 15 by the spring force of the spring 10, and the conveying roller 6 then moves upwardly. As the conveying roller 6 moves upwardly, the gear 61 starts rotating in a reverse direction and the disc device then starts the ejection operation of ejecting the disc 5 to outside the main unit thereof. At this time, the contact part 33 consisting of the pin disposed on the side surface of the end portion of the roller base member 3 acts on the cam-shaped contact part 45 of the slider member 4 to cause this slider member to retract in a direction of an arrow shown in FIG. 16 from a position shown by a sloped line to the standby position which is a position shown by a solid line.

Because the disc device in accordance with Embodiment 2 is constructed as mentioned above, the contact parts 33 and 45 are being in contact with each other until the slider member 4 returns to the standby position. Therefore, the spring 46 which is provided in Embodiment 1 as the pushing member for returning the slider member 4 to the standby position can be eliminated. Furthermore, because the contact part 33 consisting of the pin, and the cam-shaped contact part 45 are always in contact with each other, no displacement occurs in the slider member even if a shock due to a fall or the like of the disc device is applied to the slider member. Therefore, the present embodiment offers an advantage of being able to certainly prevent breakage from occurring due to a collision of the slider member with another member.

Industrial Applicability

As mentioned above, in the disc device in accordance with the present invention, because the contact parts are disposed relatively in such a way that the slider member is moved to the standby position through the movement of the roller base member which moves the conveying roller to the disk conveying position, the problem that the slider member cannot return to the standby position is solved while even when a shock is applied to the slider member, any displacement from the standby position is prevented from occurring in the slider member and breakage due to a collision with another member is therefore prevented from occurring in the slider member. Therefore, the disc device in accordance with the present invention is suitable for use as playback equipment for playing back a CD or a DVD, or the like.

The invention claimed is:

1. A disc device comprising:

a slider member configured to be pushed and moved from a standby position, when a disc is inserted into a predetermined position of a main unit of the disc device, by a movement of a disc detection member detecting this insertion;

a rack formed in said slider member and engaged with a driving gear disposed in the main unit by a movement of the slider member;

a conveying roller configured to perform both insertion and ejection of the disc into and from the main unit, and rotatably supported by a roller base member;

a cam part formed in the slider member, and configured to drive the conveying roller in a direction away from a disk conveying position together with the roller base member according to the movement of the slider member;

a pushing member configured to supply the roller base member with a spring force to locate the conveying roller at the disk conveying position;

a playback base equipped with a turntable, and configured to be supported by the main unit via a buffer member when a restriction on the playback base is released according to the movement of the slider member;

an arm clamp rotatably supported by the playback base, and configured to press the disc onto the turntable when a restriction on the arm clamp is released according to the movement of the slider member and a plurality of contact parts formed in relative positions on both the roller base member and the slider member, and configured to push the slider member, when the disc is ejected from the main unit, to retract the slider member toward the standby position by contacting with each other in accordance with a movement of the roller base member, where the movement of the roller base member causes the conveying roller to move toward the disc conveying position.

2. The disc device according to claim 1, wherein the contact parts include a combination of a pin and a cam-shaped part.

3. The disc device according to claim 2, wherein the pin is formed in the roller base member, and the cam-shaped part is formed in the slider member.

4. The disc device according to claim 2, wherein the pin is formed in the slider member, and the cam-shaped part is formed in the roller base member.

5. The disc device according to claim 1, wherein the contact parts include a plurality of projections.

* * * * *